US008021551B2

(12) United States Patent
Harrison

(10) Patent No.: US 8,021,551 B2
(45) Date of Patent: Sep. 20, 2011

(54) ECO-TREATMENT SYSTEM

(76) Inventor: Mark Harrison, Indianapolis, IN (US)

( * ) Notice: Subject to any disclaimer, the term of this patent is extended or adjusted under 35 U.S.C. 154(b) by 305 days.

(21) Appl. No.: 12/383,755

(22) Filed: Mar. 27, 2009

(65) Prior Publication Data

US 2009/0255862 A1 Oct. 15, 2009

Related U.S. Application Data

(60) Provisional application No. 61/072,291, filed on Mar. 27, 2008.

(51) Int. Cl.
*C02F 3/32* (2006.01)
(52) U.S. Cl. ............. 210/602; 210/617; 210/170.08; 210/906
(58) Field of Classification Search .......... 210/602, 210/615, 616, 617, 906, 170.01, 170.08
See application file for complete search history.

(56) References Cited

U.S. PATENT DOCUMENTS

| | | | | |
|---|---|---|---|---|
| 5,156,741 | A * | 10/1992 | Morrison et al. | 210/602 |
| 5,690,827 | A * | 11/1997 | Simmering et al. | 210/602 |
| 6,652,743 | B2 * | 11/2003 | Wallace et al. | 210/170.01 |
| 6,830,688 | B2 * | 12/2004 | Austin et al. | 210/602 |
| 7,361,268 | B2 * | 4/2008 | Ogden | 210/150 |
| 2003/0024874 | A1 * | 2/2003 | Wallace et al. | 210/602 |

OTHER PUBLICATIONS

Chen et al., Application of a constructed wetland for industrial wastewater treatment: A pilot-scale study, Chemosphere, vol. 64, pp. 497-502 (2006).*
Nordin, Leachate Treatment Using Constructed Wetland with Magnetic Field, Universiti Teknologi Malaysia, http://eprints.utm.my/3595/1/NoorIdaAmalinaAhamadNordinMAD2006TTT.pdf, pp. 1-21 (2006).*

* cited by examiner

*Primary Examiner* — Fred Prince
(74) *Attorney, Agent, or Firm* — Gary K. Price

(57) ABSTRACT

A system and method of treating wastewater from an animal confinement operation. The system including at least a first lagoon receiving water from the confinement operation. The system further including a free surface water wetland, a subsurface flow wetland and a vertical flow recirculating media filter. The first artificial wetland including a pipe such that water from the lagoon flows into the first artificial wetland through an inlet of the pipe and is contained within the wetland. The first wetland further including a plurality of wetland plants. A second subsurface flow wetland and a vertical flow recirculating media filter on top of the subsurface flow wetland and wetland plants contained within a first pea gravel bed on top of a coarse gravel bed of the subsurface flow media filter such that water from the lagoon is received by the first wetland. A recirculation pump receiving water from the horizontal coarse gravel bed and the pump recirculating water to the wetland plants of the vertical flow recirculation media filter such that ammonia in the water is converted to nitrate and water as it falls vertically through roots of the wetland plants and the nitrate is converted to nitrogen and water as the water flows horizontally through the subsurface flow wetland.

13 Claims, 3 Drawing Sheets

ECO-TREATMENT SYSTEM

CROSS REFERENCES TO RELATED APPLICATIONS

U.S. Provisional Application Patent No. 61/072,291, filed Mar. 27, 2008, with title "Eco-Treatment And Odor Control Method And System" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates to treatment of animal waste.

2. Brief Description of Prior Art

Large confinement and feedlot operations (CAFOs) creates significant environmental problems, including release of raw animal sewage into waste systems, release of ammonia and other odors into the air, release of nutrient rich wastewater into streams and into the groundwater. Combating these problems significantly increases the cost of operating CAFOs'. At the same time, regulations targeting CAFO problems are increasing, reflecting society's desire to reduce the ecological threat from CAFOs.

Prior art solutions to the waste problems of CAFOs have included the controlled application of waste to large areas of farmland. The idea is that the liquid waste acts as a fertilizer. This prior art technique has several problems. The smell often drives down property values and has led to lawsuits. Accidental over application leads to release of the liquid sewage into either streams or groundwater. The effective application needs to include chemical treatments to reduce certain undesired aspects of the liquid sewage such as chemical treatment to reduce phosphorus and ammonia, nitrites and nitrates, for example. To date, phosphorus removal by chemical addition has been a costly alternative for agricultural application. This has been due in part because of the amount of total solids that are typical of manure lagoon effluent.

Some measures of discharge hazards from CAFOs' include: biological oxygen demand (BOD), total suspended solids (TSS), total ammonia nitrogen ($NH_3^-N$), nitrate nitrogen ($NO_3^-N$), total kjeldahl nitrogen (TKN), ortho phosphorus ($PO_4^-P$), total phosphorus (TP), potassium, metals, total coliform bacteria and *Escherichia coli*. (*E. coli*), for example.

As will be seen from the subsequent description, the preferred embodiments of the present invention overcome shortcomings of the prior art.

By processing the wastewater through the proposed system the nutrient loading of wastewater will be reduced which in turn reduces the required area needed land irrigation. The recycle of treated effluent back to the storage lagoons will aid in alleviating high concentration of nutrients and total soluble Solids (TSS) that can inhibit biological action. While this is a significant advancement in wastewater processing for CAFOs, the process will allow CAFOs to meet the zero discharge requirements that have been ordered by the federal courts for revised EPA regulations. Furthermore, ETOCS will limit the real risks of breaches in raw wastewater lagoons that often contaminate water resources each year. Enhancement of the landscape and biological diversity with plants and wildlife is another added value of the system.

The addition of the phosphorous removal system will provide supplemental treatment of phosphorus that is not removed via wetland treatment. This management option will assist CAFO operators in controlling this nutrient in effluents. The Eco-Treatment System™ can be fine tuned for land application to meet the nutrient or watering needs of crops. Ultimately, this will reduce the number of acres needed for land application and costs related to maintenance and handling of animal waste.

SUMMARY OF THE INVENTION

By processing the wastewater through the proposed system, the nutrient loading of wastewater will be reduced which in turn reduces the required area needed for land irrigation. The recycle of treated effluent back to the storage lagoons while aid in alleviating high concentration of nutrients and total soluble solids (TSS) that can inhibit biological action. While this is a significant advancement in wastewater processing for CAFOs, the process will allow CAFOs to meet the zero discharge requirements (closed system) that have been ordered by the federal courts for revised EPA regulations. Furthermore, etocs will limit the real risks of breaches in raw wastewater lagoons that often contaminate water resources each year. Enhancement of the landscape and biological diversity with plants and wildlife is another added value of the present system.

The addition of the phosphorous removal system will provide supplemental treatment of phosphorous that is not removed via wetland treatment. This management option will assist CAFO operators in controlling this nutrient in effluence. The E-Treatment System can be fine tuned for land application to meet the nutrient or watering needs of crops. Ultimately, this will reduce the number of acres needed for land application and costs related to maintenance and handling of animal waste.

The present invention includes:

Eco-Treatment System.

The Eco-Treatment System is a natural wastewater treatment system for sanitary wastewater that has shown the ability to meet groundwater standards for drinking water. Applicant is confident that it can demonstrate this same degree of treatment for higher strength waste such as manure lagoon effluent. The Eco-Treatment System consists of three primary components: a free-water-surface flow constructed wetland, a subsurface-flow constructed wetland and a vegetated vertical-flow recirculating media (VFRMF) filter which lies atop the subsurface-flow constructed wetland covering all or a portion of the subsurface-flow constructed wetland depending on the project organic strength of the pretreated influent. For CAFO application, these three process units will be combined with a surface-flow wetland in order to reduce capital costs. The system will use synthetic liners to isolate the wastewater from the groundwater. The size of the three unit processes will be based on the average daily flowrates required to be removed from the pretreatment lagoons and the known or projected biological oxygen demand (BOD), total suspended solids (TSS) and total ammonia nitrogen concentrations based on existing $1^{st}$ order kinetic removal equations.

Phosphorous Removal System.

The final unit process is a lagoon for phosphorous removal using one or several in combination coagulants to cause the remaining phosphorous to be removed from the wastewater by physical settlement. It is projected that, combined with the Eco-Treatment System, the water quality will be such that much less chemical will be required for phosphorous reduction and make phosphorous removal cost-effective for agriculture. The sizing of the lagoon and chemical storage and feed system for the Phosphorous Removal System will be based on the projected average and peak flows and remaining phosphorous concentration in the wastewater leaving the Eco-Treatment System.

DESCRIPTION OF THE PREFERRED EMBODIMENT

The two types of constructed wetlands are free-water surface (FWS) and subsurface-flow wetlands (SF). FWS wetlands have shallow water depths and usually support a variety of emergent, submergent, and floating species of wetlands plants. FWS wetlands are also termed "aerobic wetlands", and treatment primarily occurs from oxidation, hydrolysis, and sedimentation. FWS wetlands are recommended for the treatment of livestock facility wastewater. It is a leading choice for secondary treatment of animal waste from lagoons. FWS wetlands have been used to treat effluent from waste treatment lagoons, waste storage ponds, and milk houses as well as runoff from open feedlots.

Subsurface-flow wetlands (SF) are routinely used for the treatment of sanitary wastewater in small applications. As the name implies the water level is kept below the surface of the wetland by the use of a porous media, usually gravel. The wastewater flows horizontally through the media and is exposed to the root systems of wetland plants which grow up through the media.

Figure 1:
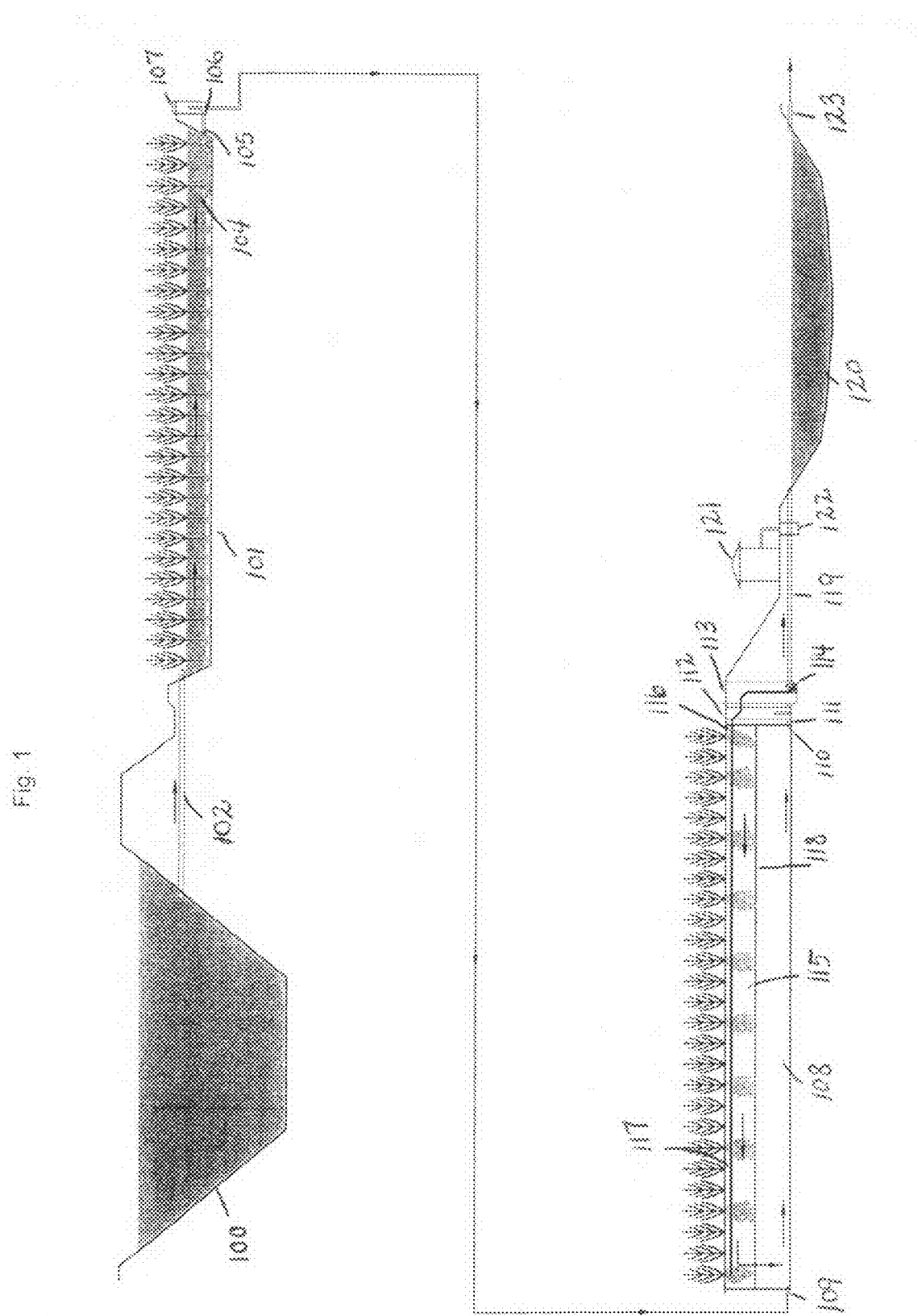
FIG. 1 is a flowchart of the system; and,
FIG. 2 is a cross-sectional view of the nitrogen cycle according to the present invention.

In accordance with the present invention, FIG. 1 shows a cross-section of a conceptual flow diagram. Raw waste is first allowed to settle in a containment area such as large tank pits or a lagoon or a series of lagoons. Following lagoon storage and treatment of wastewater, the lagoon 100 effluent moves into free-water surface (FWS) artificial wetlands system 101 where solids are filtered out and some organic matter is decomposed. FWS systems 101 augment lagoon contaminant removal processes by slowly flowing wastewater through stands of dense emergent vegetation. The biomass of the emergent plants 125 provides surfaces for biofilms which adsorb and decompose pollutants and the plants 125 create conditions which aid sedimentation and filtration. Liquid effluent moves, by gravity, to the horizontal flow stage 101 through pipe 102. Effluent from the pretreatment lagoon 100 will be discharged to the FWS 101 through a submerged influent manifold 103 and travel horizontally through the FWS. Prior to discharge the wastewater will flow horizontally through a gravel filter 104 for additional TSS removal prior to collection in the effluent manifold 105 and discharge through effluent pipe 106 The effluent pipe 106 includes a level control structure 107 which allows for the water level in the FWS to be controlled and varied.

Wastewater then enters the SF portion 108 of the Eco-Treatment System through a submerged influent manifold 109 and travel horizontally through the SF's gravel media. The wastewater flows horizontally to the effluent manifold 110 and discharges from the effluent pipe 111. The effluent manifold 110 includes a level control structure 112 which allows for the water level in the SF to be controlled and varied.

The wastewater then enters the recirculation pump station 113. Wastewater is pumped by a recirculation pump 114 from the recirculation pump station 113 to the raised vertical-flow recirculating media filter (VFRMF) 115 portion through a recirculation pipe 116 where it is distributed throughout the bed by subsurface drip tubing 117. The wastewater then flows back into the front end adjacent influent manifold 109 of the SF wetland 108 being direct by an intermediate liner 118 between the VFRMF 115 and the SF 108.

When the volume of water in the recirculation pump station 113 exceeds the volume of the recirculation pump station basin the wastewater flows through the effluent pipe 119 and discharges to the phosphorous removal pond 120. Flocculating chemicals such as ferric chloride are pumped from the chemical feed system 121 into a chemical mixing structure 122 at the end of the effluent pipe 119 to mix with the wastewater prior to discharge to the phosphorous removal pond 120. Phosphorous is precipitated out of the wastewater and settles to the bottom of the phosphorous removal pond 120 where it can be removed on a periodic basis. From the phosphorous removal pond 120 the wastewater flows from an effluent pipe 128 where it can be land applied, used as flush water or recycled back to the lagoon system.

The Eco-Treatment System is a combined three-stage system that utilizes:

Horizontal flow stage in the FWS 101 for reduction of biological oxygen demand (BOD), total suspended solids (TSS) and other pollutants. Horizontal flow stage in the SF 108 for denitrification, continued reduction of biological oxygen demand (BOD), total suspended solids (TSS). Vertical flow stage 115 is primarily for nitrification through aerobic vegetated media.

Figure 2:
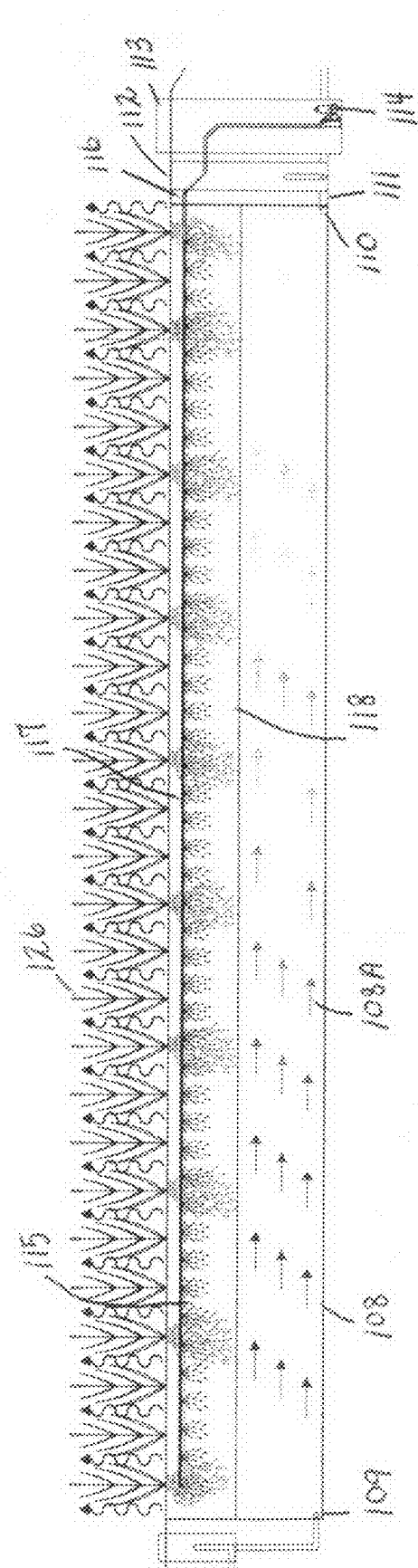

The Eco-Treatment concept in the SF involves the influent shown by arrows 108A flowing through the horizontal stage 108, sequenced with recirculation and pumped vertical downflow through the porous filter bed 115 with wetland plants 126. Microbes attach to media and in rootzone facultative and aerobic bacteria work on the wastewater as it percolates through the top filter bed VFRMF 115. The flow through the top filter bed 115 encounters the intermediate liner 118 and flows horizontally back to the influent end of the SF 108 and continues into the horizontal stage. A continuous reducing and oxidizing condition is created between the two stages. This greatly enhances the nitrification/denitrification cycle, as the vertical flow cycle utilizes the aerobic pore space and processes within the rootzone. This concept is illustrated in FIG. 2.

Two bacteria are responsible for nitrification in the top vegetated filter bed 115 occurs in two steps, by *Nitrosomonas* sp. (oxidize ammonia $NH_4^+$):

$$2NH_4^+ + 3O_2 \rightarrow 2NO_2^- + 2H_2O + 4H^+ \text{ energy}$$

and *Nitrobacter* sp. (oxidizes nitrite to nitrate):

$$2NO_2^- + O2 \rightarrow 2NO_3^- + \text{energy}.$$

The removal of nitrogen by denitrification occurs in the horizontal stage, where nitrate is converted to nitrogen gas under anoxic conditions that vents to the atmosphere naturally:

$$NO_3^- \rightarrow NO_2^- \rightarrow NO \rightarrow N_2O \rightarrow N_2$$

Other contaminants are removed through media filtration, decomposition, microbial oxidation and reduction, plant uptake, particulate sedimentation and sorption of dissolved species on media and biofilms. This subsurface design restricts growth of algae (which creates turbidity, suspended solids and BOD in effluent), controls odors and prevents mosquito problems.

The treatment sequence is analogous to an activated biofilter and conventional aerobic/biological treatment processes commonly used in municipal waste treatment. These processes prove to be well-suited for the removal of ammonia-nitrogen by oxidizing it to nitrate-nitrogen. This distinct recirculation system has an advantage in areas where nitrogen contamination is a problem. The recirculation system improves overall efficiency as the recycle establishes long residence times, dilutes the strength of influent wastewater into the horizontal stage of the Eco-Treatment cell and maintains the microbial biomass around the rootzone of the vertical flow vegetated filter.

Figure 3:
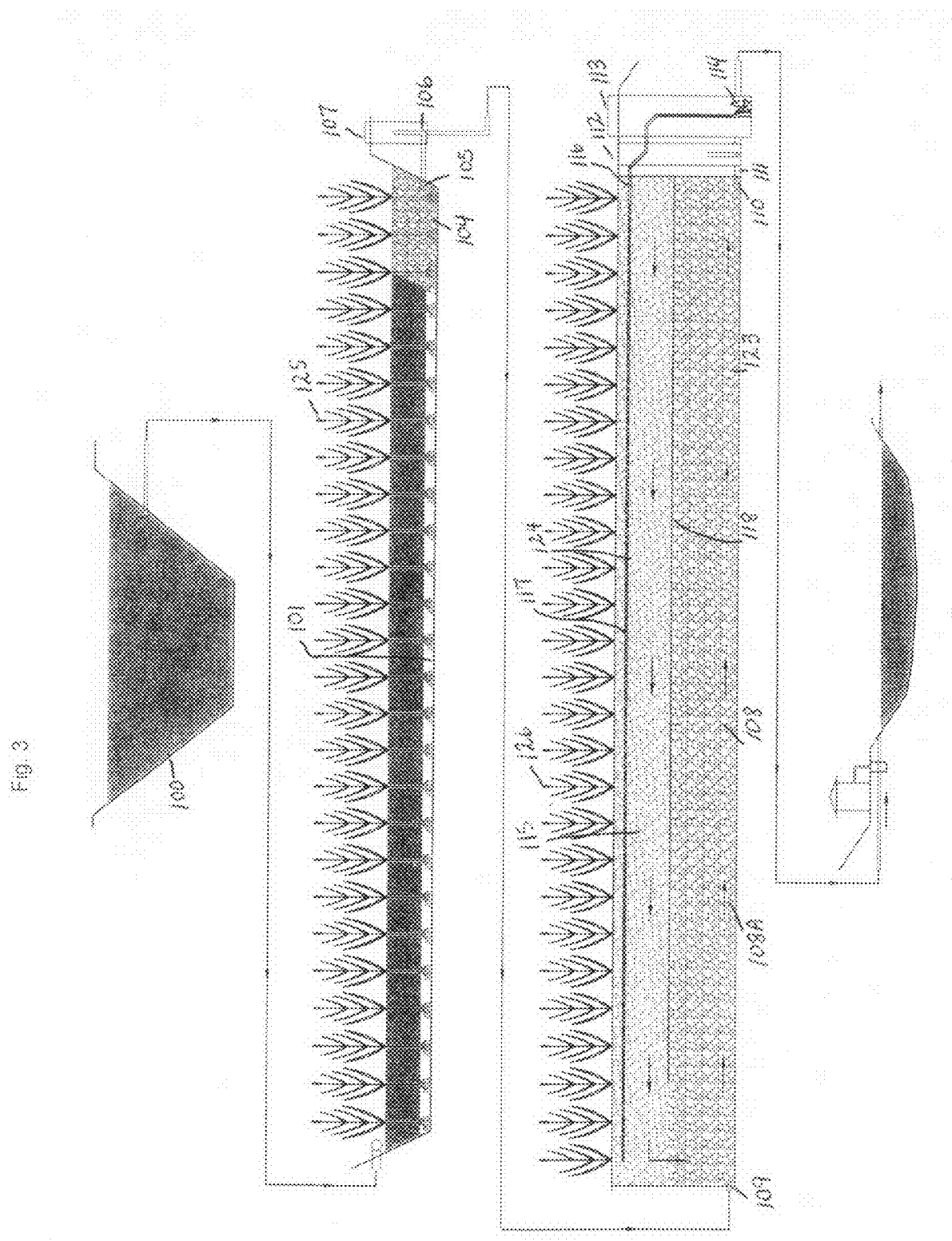
FIG. 3 is a detailed view of the system shown in FIG. 1.

FIG. 3 shows details of the construction of the system. The Eco-Treatment System is designed to have a surface area with a L:W ratio of 1:1 or greater. The horizontal stage of the FWS 101 is excavated to three (3) feet in depth to allow for one (1) foot of free board and up to two (2) feet of water depth but will typically be operated at a one (1) foot depth or less. The SF 108 and VFRMF 115 is excavated to five and one half (5.5) feet in depth. The horizontal stage of the SF 108 is three (3) feet in depth and filled with 0.5-1.5 inch washed gravel 123. The vertical filter VFRMF 115 located above the SF planted, and is 2.5 foot in depth with 3.8 inch washed pea gravel 124. Horizontal rows of 0.5 inch perforated subsurface irrigation tubing 117 distributes flow from the pump 114 outlet pipe 116 into the VFRMF 115 from the recirculation tank 113. Plants 125 contained in the FWS wetland include wetland species and emergent plants that have extensive roots and rhizomes to facilitate rapid spread and large root service area for contaminant absorption, decomposition and uptake and that can thrive in anaerobic water saturated environment. Plants 125 are typically wetland species, particularly hard and soft stem bulrushes (*Scirpus* sp.) and sedges (*Carex* sp.). The VFRMF is planted with a broad mix of wet-mesic prairie grasses 126 such as Wool-grass (*Scirpus cyperinus*) and Prairie Cordgrass (*Spartina pectinata*). Plants can play an integral part in the treatment processes in constructed wetlands. Although wetland plants 125 play a direct role in nutrient uptake, the interaction with wastewater with their rhizosphere and microbes play a greater role. Rhizosphere refers to the area of the soils adjacent the roots or rhizomes of the plants. Wastewater treatment is constructed in wetlands is primarily accomplished through microbial metabolism. Additionally, the roots of the wet mesic grasses in the VFRMF 115 detain the water traveling vertically through the graveland greatly increase the systems 10 retention time which increases the systems ammonia conversion efficiency.

Water level is controlled by adjustment sumps 107 and 112 This allows for operation, control and the ability to isolate cells for maintenance purposes. Additionally the operation of the recirculation pump 114 is controlled by a timer to increase or decrease the recirculation duration which enables the control of the degree of nitrification. The final treated effluent can be used in agricultural irrigation, animal enclosure Cleaning, or manure pit washout.

Constructed wetland systems require that high strength raw wastewater be pretreated in lagoons 100, to remove solids from the waste stream. The Eco-Treatment System will utilize the pretreatment of the conventional lagoon 100 and connect with an FWS/SS/VFRMF treatment sequence for nitrogen control/removal by nitrification-denitrification, and post-treatment of effluent by phosphorus removal unit for optimal phosphorus removal.

Although the description above contains many specificities, these should not be construed as limiting the scope of the invention but as merely providing illustrations of some of the presently preferred embodiments of this invention.

It would be obvious to those skilled in the art that modifications be made to the embodiments described above without departing from the scope of the present invention. Thus the scope of the invention should be determined by the appended claims in the formal application and their legal equivalents rather than by the examples given.

I claim:

1. A system for treatment of wastewater from an animal confinement operation including:
    at least a first lagoon receiving water from said confinement operation;
    a first artificial wetland contained in a liner, said first artificial wetland is a free water surface wetland, water from said lagoon flows into said first artificial wetland through an influent and is contained within said first artificial wetland and said first artificial wetland including a first plurality of wetland plants;
    a flow control receiving water from said first artificial wetland and said flow control providing water to a second wetland wherein said second wetland is a subsurface flow wetland including a course gravel bed,
    a pump recirculating water from said subsurface flow wetland to a vertical flow recirculating media filter including a second plurality of wetland plants, wherein ammonia in said water is converted to nitrate as it contacts roots of said second plurality of wetland plants, wherein said recirculation pump is located in a pit below said coarse gravel bed and said flow controls the water level in said first artificial wetland.

2. The system for treatment of wastewater as recited in claim 1, wherein said first wetland plants include emergent plants having rhizomes.

3. The system for treatment of wastewater as recited in claim 2, wherein said first wetland plants include at least one plant selected from bulrushes (*Scirpus* Sp.) and sedges (*Carex* sp.).

4. The system for treatment of wastewater as recited in claim 2, wherein said second wetland plants include at least one plant selected from wool-grass (*Scirpus Cyperinus*) and Prairie Cordgrass (*Spartina pectinata*).

5. The system for treatment of wastewater as recited in claim 2, wherein said vertical flow recirculating media is pea gravel that sits on top of said subsurface flow wetland and is separated from said subsurface flow wetland by an intermediate liner that guides water from said vertical flow recirculating media back to an inlet of said subsurface flow wetland.

6. The system for treatment of wastewater as recited in claim 1, wherein overflow water from said pit flows to a pond for phosphorous removal.

7. A system for treatment of wastewater from an animal confinement operation comprising:
    at least a first lagoon receiving water from said confinement operation;
    a first artificial wetland, said first artificial wetland is a free water surface wetland, water from said lagoon flows into said first artificial wetland through a first inlet and is contained within said first artificial wetland and said first artificial wetland including a first plurality of wetland plants;
    a flow control receiving water from said first artificial wetland and said flow control providing water to a second wetland wherein said second wetland is a subsurface flow wetland including a coarse gravel bed;
    a pump pumping water from said subsurface flow wetland through drip tubing to a vertical flow recirculating media filter including a second plurality of wetland plants, wherein ammonia in said water is converted to nitrate as it contacts roots of said second plurality of wetland plants, wherein said vertical flow recirculating media is pea gravel that sits on top of said subsurface flow wetland and is separated from said subsurface flow wetland by an intermediate liner that guides water from said vertical flow recirculating media back to an inlet of said subsurface flow wetland.

8. The system as recited in claim 7, wherein said first plurality of wetland plants have rhizomes.

9. The system as recited in claim 7, wherein said recirculation pump is located in a pit below said coarse gravel and wherein said vertical flow recirculating media includes pea gravel.

10. A closed system for treatment of wastewater comprising:
at least a first lagoon receiving water from an animal confinement operation;
a first artificial wetland, said first artificial wetland is a free water surface wetland, water from said lagoon flows into said first artificial wetland through a first inlet and is contained within said first artificial wetland and said first artificial wetland including a first plurality of wetland plants;
a flow control receiving water from said first artificial wetland and said flow control providing water to an inlet to a second wetland wherein said second wetland is a subsurface flow wetland including a coarse gravel bed,
a pump pumping water from an outlet of said subsurface flow wetland through a drip tubing to a vertical flow recirculating media filter including a second plurality of wetland plants, wherein ammonia in said water is converted to nitrate as it contacts roots of said second plurality of wetland plants, wherein said vertical flow recirculating media is pea gravel that sits on top of said subsurface flow wetland and is separated from said subsurface flow wetland by an intermediate liner that guides water from said vertical flow recirculating media back to said inlet of said subsurface flow wetland.

11. The system as recited in claim 10, wherein said first wetland plants have rhizomes.

12. The system for treatment of wastewater as recited in claim 10, wherein said first wetland plants include at least one plant selected from bulrushes (*Scirpus* sp.) and sedges (*Carex* sp.)

13. The system for treatment of wastewater as recited in claim 10, wherein said second wetland plants include at least one plant selected from wool-grass (*Scirpus Cyperinus*) and Prairie Cordgrass (*Spartina pectinata*).

* * * * *